United States Patent [19]

Van Loo et al.

[11] Patent Number: 4,866,252
[45] Date of Patent: Sep. 12, 1989

[54] HEAT-RECOVERABLE ARTICLE

[75] Inventors: Robert H. Van Loo, Linden, Belgium; Johannes M. Cordia, Portola Valley, Calif.

[73] Assignee: NV Raychem SA, Kessel-lo, Belgium

[21] Appl. No.: 314,315

[22] Filed: Feb. 22, 1989

[30] Foreign Application Priority Data

| May 6, 1986 [GB] | United Kingdom | 8611010 |
| May 27, 1986 [GB] | United Kingdom | 8612779 |
| Mar. 11, 1987 [GB] | United Kingdom | 8705734 |

[51] Int. Cl.$^4$ .............................................. H05B 3/58
[52] U.S. Cl. ................................ 219/535; 219/541; 219/544; 338/22 R
[58] Field of Search ............... 219/534, 541, 543, 549, 219/555, 544; 338/22 R, 22 S D; 156/86

[56] References Cited

U.S. PATENT DOCUMENTS

| 3,020,378 | 2/1962 | Eisler | 219/535 |
| 4,168,192 | 9/1979 | Nyberg | 156/86 |
| 4,379,009 | 4/1983 | Shibata | 156/86 |
| 4,464,565 | 8/1984 | Spangler | 219/535 X |
| 4,530,521 | 7/1985 | Nyffeler | 219/544 |
| 4,570,055 | 2/1985 | McMills | 219/535 X |
| 4,575,618 | 3/1986 | Rosenzweig | 219/535 |
| 4,628,989 | 12/1986 | Parker et al. | 219/535 X |

FOREIGN PATENT DOCUMENTS

| 526669 | 1/1980 | Australia . |
| 175554 | 3/1986 | European Pat. Off. . |
| 79702 | 5/1986 | European Pat. Off. . |
| 195683 | 9/1986 | European Pat. Off. . |
| 117762 | 11/1986 | European Pat. Off. . |
| 84/03346 | 8/1984 | PCT Int'l Appl. . |
| 508471 | 7/1971 | Switzerland . |
| 1265194 | 3/1972 | United Kingdom . |
| 1529353 | 10/1978 | United Kingdom . |
| 2076489 | 2/1981 | United Kingdom . |
| 2071258 | 9/1981 | United Kingdom . |
| 2012149 | 6/1982 | United Kingdom . |
| 2082707 | 10/1982 | United Kingdom . |
| 2111238 | 6/1983 | United Kingdom . |
| 2136259 | 9/1984 | United Kingdom . |

*Primary Examiner*—C. L. Albritton
*Assistant Examiner*—M. Lateef
*Attorney, Agent, or Firm*—Edith A. Rice; Herbert G. Burkard

[57] ABSTRACT

A heat-recoverable article for bonding to an object, particularly for sealing a joint between pre-insulated pipes, consists of a layer of heat-recoverable polymeric material, a layer of a bonding material which preferably is heat-activatable, and a laminar metal heating element which has a plurality of apertures through its thickness to permit the element to be deformed in the plane thereof by a change in the shape of the apertures, and which is inbuilt either in one of or between the said layers. The recoverable material is arranged so that when it is heated by the element, it can recover and deform the element as aforesaid, in use to force the layer of bonding material against the object.

15 Claims, 1 Drawing Sheet

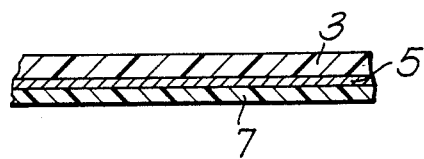
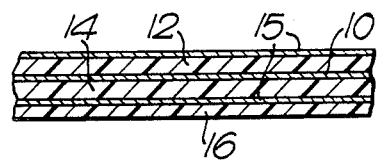
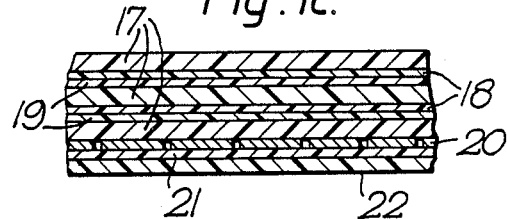
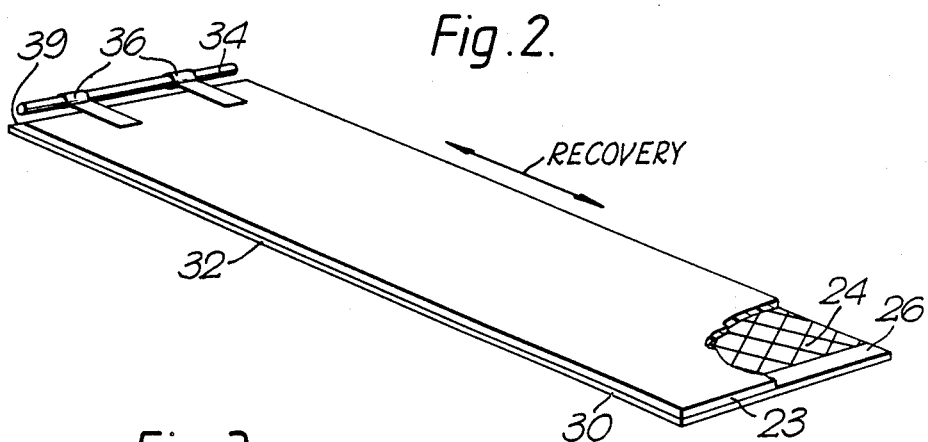
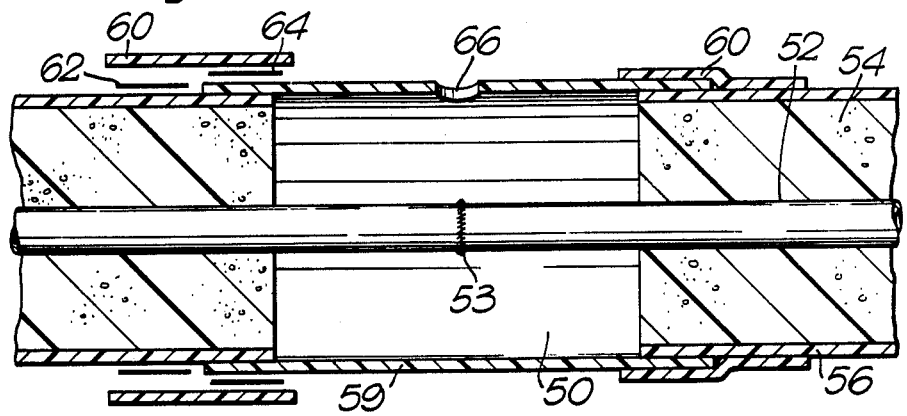

4,866,252

HEAT-RECOVERABLE ARTICLE

This application is a continuation of application Ser. No. 07/047,234, filed May 6, 1987 now abandoned.

BACKGROUND OF THE INVENTION

The present invention relates to a heat-recoverable article for bonding to an object such as a pipe, for example to seal the object against ingress of moisture or to protect against physical damage, or to make a joint between the object and another object.

A heat-recoverable article is one whose dimensional configuration can be made to change substantially when subjected to heat treatment. A heat-recoverable article will usually recover towards an original shape from which it has previously been deformed but the term as used herein also includes articles which adopt a new configuration when subjected to heat treatment, even if it has not previously been deformed.

Heat-recoverable articles may be used in the sealing of pipe joints, the repair of polymeric coatings on pipes and similar structures, the protection from chemical and physical attack of pipes and other structures, often metallic They may also be used to seal cable splices.

When a joint is made between two lengths of thermally insulated steel pipe, as used for example in a district heating system, it is necessary to remove the insulation from the end regions of each length of pipe in order that the insulation is not burnt when the pipes are joined, for example by welding. After the weld has been completed, the uninsulated portion of the pipe in the region of the joint must be reinsulated in order to minimise heat loss. It is important that the insulation in the region of the joint is sealed against moisture ingress which might otherwise cause degradation of the insulation, not only in the joint region but possibly also along the pipes to some distance from the joint, and cause also corrosion of the pipes.

Severe physical constraints are placed upon the seal of the insulation at a joint between insulated pipes in a district heating system. As a result of frequent and wide temperature cycling, the pipe can be subject to expansion and contraction cycles and to longitudinal and transverse movements. For example, it has been determined that forces of up to 10 N.mm$^{-2}$ can be exerted on the outer protective jacket of an insulated pipe as a result of temperature cycles experienced by a pipe in winter before it is buried. The seal must be able to withstand these cycles and movements without breaking. Furthermore, it is preferred that the seal be able to withstand the pressures exerted when the cavity around the uninsulated portion of pipe is reinsulated by foaming in situ.

One approach that has met with considerable success is the subject of GB No.-A-2108625. In one aspect, it involves creating a flexible seal, between the insulation surrounding each pipe and a rigid casing which spans the uninsulated portion of pipe, by means of a heat-recoverable polymeric sleeve coated with a sealant. To prevent movement of the sealant coated sleeve of GB No.-A-2108625 relative to the pipe, the sleeve is provided with adhesive material at specified regions to bond the sleeve to the pipe insulation and to the casing.

The flexible seal approach described above has been found to be satisfactory in the majority of applications. There is however a demand for a seal for the insulation at a pipe joint which is rigid and which is sufficiently strong to withstand the forces encountered during installation and in SO use without stretching or flexing to any significant extent, or breaking. One example of a rigid seal system for an insulated pipe joint is described in EP-A-No. 138864.

In order to achieve the strength required of a rigid seal, it would be necessary for the heat-recoverable sleeve to be relatively thick, having a thickness of for example at least 2 mm, the actual thickness depending to some extent on the size of the pipes to be connected. When heating a sleeve of such thickness by conventional means such as a gas torch or hot air gun (as disclosed in EP-A-No. 138864), there is a danger of burning the outside of the sleeve before the inside of the sleeve has been heated sufficiently for it to recover, particularly in the case of sleeves with a thickness of at least 5 mm. This can lead to failure of the seal by splitting of the sleeve.

We have now devised a heat-recoverable article, comprising an inbuilt laminar heating element for heating the article to effect recovery, which element can be deformed as the article recovers.

SUMMARY OF THE INVENTION

Accordingly, in a first aspect the invention provides a heat-recoverable article for bonding to an object, comprising a layer of heat-recoverable polymeric material, a layer of a bonding material for forming a bond between the recoverable material and the object, and a laminar metal heating element having a plurality of apertures through its thickness to permit the element to be deformed in the plane thereof by a change in the shape of the apertures, and being inbuilt in one of, or between, the said layers, the recoverable material being arranged such that when heated by the element, it can recover and deform the element as aforesaid, in use to force the layer of bonding material against the object.

DETAILED DESCRIPTION OF THE INVENTION

The heat-recoverable article of the invention has the significant advantage that it comprises an inbuilt heating element which permits the sleeve to be heated uniformly (or otherwise as desired) over its area and throughout its thickness. As used herein the term "inbuilt" is used to denote a construction of article in which the heating element is disposed between layers of the article, whether the layers be of like or unlike material. The use of an electrically powered heater also allows the amount of heat supplied to the sleeve to be controlled, thereby minimising the risk of burning the sleeve and its subsequent failure by splitting. The use of a suitable apertured heating element allows the article to recover, without hindrance by the element, by changing the shape of the apertures.

The provision of an inbuilt heater in the article of the invention can have the further advantage of providing additional reinforcement, particularly by selection of a tough material for the heater such as a perforated steel sheet. The heater can also be arranged to reduce the tendency of the polymeric material of the sleeve to creep. Furthermore, the heater can protect an object against physical damage for example due to abrasion against or collision with a body when in use.

The layer of recoverable material and the heating element will be selected such that:

(a) the heating element has a sufficiently high heat output to heat the sleeve to its recovery temperature; and (b) the heating element is sufficiently deformable that it can be deformed by the sleeve as it recovers.

The deformability of the heating element is dependent on several factors, including the material of the element, its thickness and the size, shape and distribution of the apertures. These factors will also influence the heat output of the element. For example, it is preferred that these factors are arranged to provide a heating element with an electrical resistivity of from $1.7 \times 10^{-6}$ to $100 \times 10^{-6}$ ohm.cm, more preferably of from $1.7 \times 10^{-6}$ to $10 \times 10^{-6}$ ohm.cm. Preferred materials of the heating element include brass, aluminium, copper, steel, bronze and nickel, the selection being made according to the desired heat output and flexibility. Preferably the heating element comprises a thin sheet such as a foil in which apertures are cut. The apertures may be formed by cutting a pattern of slits in a thin sheet and then deforming the sheet so as to open the slits. Alternatively, the apertures may be formed by cutting pieces out of a thin sheet. However made, for sufficient deformability, it will usually be preferred that adjacent apertures will be elongate and will overlap. The apertures may however be regular or irregular and may be for example straight or wave-form slits or slots, oval apertures or diamond shaped apertures, the latter being particularly preferred for controlled deformability. It will generally be preferred that the apertures be regularly spaced and of substantially even size and shape for ease of manufacture, and also to provide even heat output and deformability over the area of the article. It will however be understood that unevenly arranged apertures may be advantageous for certain applications.

For some applications, it may be advantageous to provide differing heat outputs over the area of the article. For example when the article is to form a fusion bond to an object at one end region of the article, a relatively high output will be preferred at that region. This may be achieved, for example by a suitable pattern of apertures or by varying the heating element thickness.

Preferably, the heating element has a thickness of from 0.02 to 1.0 mm, more preferably of from 0.1 to 0.2 mm, the selected thickness being dependent on the other factors mentioned above.

A particularly preferred apertured foil for use as the heating element of the invention is an expanded brass foil sold by Delker Corporation under the trade mark 5 Brass 10-475.

The heating element may be coated on one or both faces with a polymeric material prior to incorporation into the article of the invention, in order to minimise the formation of air gaps in the apertures of the element when it is incorporated in the article. The coating of polymeric material can serve to optimise the strength of the bond between the heater and another layer against which the heater is placed in the article. Preferably a coating layer on the heater is positioned between the heater and the layer of bonding material, when it is particularly preferred that the coating layer is lightly cross-linked to protect the bonding layer from being punctured by the heater.

The requirements mentioned above of the heating element having sufficient heat output and being sufficiently deformable will also be influenced by the nature of the layer of recoverable material and by the overall construction of the article. Thus for example a thicker layer, or a layer of low thermal conductivity material will generally require a relatively high heat output.

When a relatively undeformable heating element is selected, for example to achieve a suitable heat output, it is preferred to use a high recovery force polymeric layer. This may be achieved for example by using a relatively thick layer of heat-recoverable polymeric material. When a single layer of heat-recoverable material is used (be it thick or otherwise) the heating element will advantageously be located between the layers of recoverable material and bonding material, for ease of manufacture. It is desirable to position the heater adjacent to the layer of bonding material to ensure that heat is directed not only to the layers of the article (e.g. to cause the recoverable material to recover) but also to the underlying object so as to activate (e.g. fuse) its surface for bonding to the article. In an alternative construction, a high recovery force can be achieved by providing two layers of heat-recoverable material with the heating element disposed between them. This has the advantage of ensuring an especially even heat flow through the thickness of the recoverable polymer layers; furthermore the recovery force exerted on the element by the layers of recoverable material is more even, as between the two faces of the element, and the element is therefore deformed more uniformly.

The article of the invention may be reinforced to enable it to withstand greater tensile forces or to withstand greater internal pressures in a cavity that is sealed by the article. Reinforcement of the article is particularly advantageous when the article is to be used in a long piece, for example to seal a cavity around a large diameter pipe when the internal pressures to be withstood by the article are particularly high.

Reinforcement may be incorporated in or between layers of the article, and preferably is incorporated between successive layers of heat-recoverable material. One or more sheets of reinforcement may be used. When more than one reinforcement sheet is used, the sheets may be separated by layers of other material, for example bonding material or heat-recoverable material. In this way thick-wall reinforced articles of the invention may be constructed, comprising for example two layers of recoverable material and one reinforcement sheet, or three layers of recoverable material and two reinforcement sheets.

The reinforcement may be in the form of a continuous or a foraminous sheet. For example a continuous sheet of a metal (such as aluminium or brass) or polymeric material (such as the polyester sold under the trade mark Mylar) may be used. A particularly preferred reinforcement sheet is a foraminous sheet, such as an open weave of fibrous material. Use of a foraminous sheet is advantageous since the apertures therein allow the layers of material (between which the sheet is positioned) to be bonded together directly, and the risk of delamination can thereby be minimised.

A woven sheet may be formed with fibres of the same material in the warp and the weft; it can however be advantageous to use fibres of different materials in the warp and the weft to take into account the different functions that these fibres have to fulfil. For example, it can be advantageous to use fibres which can withstand a high tensile force and which are heat-stable in the direction in which the article has to withstand high loads. Glass, carbon and aramid fibres can fulfil this function. In the shrink direction of the article, fibres which are not heat-stable may be used, which can accomodate recovery of the article on heating without buckling. Polyethylene and polyester fibres are suitable.

A woven reinforcing sheet may be incorporated in the article with the fibres substantially parallel and perpendicular respectively to the principal direction of recovery of the article. It can however be advantageous to orientate the sheet so that the fibres are at an angle of from 10° to 80°, especially about 45°, to the said direction so that the sheet can accomodate a change in shape of the article, for example on recovery, without buckling of the fibres by change on the angle between the warp and weft fibres.

It is preferred to use at least one connection layer with the or each foraminous reinforcement sheet, particularly when foraminous, to promote bonding between the layers of material between which the sheet is positioned. A softenable polymer may be used for the connection layer, for example, the ethylene-ethyl acrylate copolymer sold under the trade mark DPD 6181. The connection layer may be lightly cross-linked to minimise risk of delamination of the article when heated to effect recovery.

The bonding material may be selected from materials which provide an adhesive bond and from materials which provide a fusion bond. The selection will depend on the materials of the recoverable layer and of the object to which it is to bond. Preferably the bonding material will be heat-activatable, that is for example a material which can provide a fusion bond, or if a material which provides an adhesive bond (ie. an adhesive), a hot-melt adhesive or a heat-curable adhesive. This has the advantage of providing an article with a layer of bonding material that is latent until the heating element is powered in order to cause the layer of recoverable material to recover and to activate the bonding material, and which is therefore particularly convenient during storage and during manipulation of the article prior to installation.

The layer of bonding material may comprise different materials at different areas of the article. The different materials may be different adhesive bonding materials or different fusion bonding materials. In a preferred embodiment of article, for wrapping two or more times around an object, the bonding material comprises an adhesive material at one region for bonding to the underlying object, and a fusion material for bonding to underlying layers of the article.

A heat-activatable adhesive may be distinguished from a material that forms a fusion bond as follows.

A heat-activatable adhesive (as the term is used herein) forms a bond that is based on chemical and physical interactions which are initiated when the adhesive is in its liquid phase and are retained on solidification. Examples of hot-melt adhesives which may be used as bonding material in the article of the invention are disclosed in U.S. Pat. No. 4,181,775 and U.S. Pat. No. 4,018,733, which disclose formulations comprising polyamides modified with hydrocarbon waxes, and mixtures of acidic ethylene polymers and tackifiers. Also suitable are compositions based on ethylene vinyl-acetate copolymers, blended with hydrocarbon waxes and optionally butyl rubber. A particularly prefered adhesive, especially for use on untreated surfaces and in low temperature applications, is that disclosed in GB-A-No. 2075991, which is a blend of a polyamide, an acrylic rubber and preferably a small amount of an ethylene/acrylic acid/butyl acrylate terpolymer. In order to obtain satisfactory shear performance in such adhesives, it may be advantageous to cross-link the adhesive, although the degree of cross-linking must not be so high as to reduce the ability of the adhesive to liquify, and thereby to flow and to wet the object to be bonded, and therefore to form a bond to the object with good peel strength.

A fusion bond (as the term is used herein) on the other hand is one that is based on physical interactions initiated by intimate contact between compatible materials in their visco-elastic state, and is more akin to a weld. In many (but not all) cases, compatibility of two or more polymeric compositions arises from substantial amounts of common recurring units in the polymers of the materials, such as for example when at least 50%, preferably at least 70%, of the recurring units of a polymer of a first composition are the same as at least 50%, preferably at least 70%, of the recurring units of a polymer of the other composition, these percentages being based on the total number of recurring units.

The ability of a material to form a satisfactory fusion bond can be influenced also by the hot modulus of the material. The term "hot modulus" as used herein is defined as the ratio of stress to strain when measured at 100% strain, the measurements are made on a sample which has been stored at 150° for 15 min. To form a satisfactory bonding, it will generally be the case that a fusion bonding material has a hot modulus of less than 1.0 Kg.cm$^{-2}$, especially from zero to about 0.5 Kg.cm$^{-2}$. Surprisingly, it has been found that materials which form a fusion bond can withstand the high shear forces to which they are subjected during installation and subsequently during service, notwithstanding their relatively low hot moduli when compared with adhesive materials. Furthermore, the low hot modulus of the fusion bond materials provides the further advantage of excellent peel strength.

Polymeric materials that may be used for the heat-recoverable layer, and for a fusion bonding layer include, for example polyethylene, polypropylene, polybutene, copolymers of ethylene, propylene, butene and hexene, copolymers of ethylene with ethyl acrylate, vinyl acetate, acrylic acid, methacrylic acid, acrylic esters or methacrylic esters in which polyethylene predominates, blends of these polymers, and blends of these polymers with elastomers.

A particularly preferred material for the layer of heat-recoverable material comprises polyethylene especially a high density polyethylne. Particularly preferred materials for the layer of fusion bonding material include polyethylene, ethylene vinyl-acetate copolymer, and ethylene ethyl-acrylate copolymer.

For ease of manufacture and in some applications it can be advantageous to use a heat-recoverable article in which the compositions of the heat-recoverable material and of the bonding material are substantially of the same. For example in one manufacturing process, two or more substantially identical layers may be laminated with a heating element, and the layers may then be treated so as to provide one or more layers with properties of heat-recovery and one or more layers with appropriate bonding properties.

The difference in properties, between the heat-recoverable material and the bonding material, may be advantageously be achieved by providing a higher cross-link density in the former than in the latter. The layers of the article may be cross-linked by irradiation with high energy electrons or by chemical initiation. A difference in crosslink density between different layers of the article may be achieved by irradiating one layer with a higher dose of electrons than other layers, by use of additives which retard or enhance radiation cross-linking or by controlling the depth of penetration of the irradiating electrons. The use of additives is particularly preferred since differential cross-linking can be effected in a controlled manner in a single processing step.

The article may be provided with a sheet of bonding material, contiguous with the portion of the article which comprises layers of heat-recoverable material and bonding material, to form the inner layer of the wrapped around article. Preferably the sheet of bonding material will be reinforced, for example by means of fibres, more preferably by an open weave of fibres. The sheet of bonding material may comprise a sealant or an adhesive, a hot-melt adhesive being particularly preferred. The use of a sheet of bonding material to provide the inner layer of the wrapped around article has the advantage that, as the article recovers, the object to which the article is bonded will be coated around its entire perimeter with the bonding material, not-withstanding any creep back of the internal edge of the layer of heat-recoverable material. The layer of bonding material can also serve to reduce such creep back.

Depending on the materials selected for the heat-recoverable and bonding layers, it may be advantageous to provide a thin layer of a compatibility material between those layers, to ensure strong interactions between them. For example, a thin layer of low density polyethylene or of ethylene vinyl-acetate copolymer may be incorporated at the interface between the layers of heat-recoverable and bonding materials. When more than one layer of the article is to be installed on an object by wrapping (as discussed below), the layer of heat-recoverable polymeric material can advantageously be coated on its exposed surface with a layer of compatibility material, to ensure strong interactions with any overlying layer of bonding material of the article.

Examples of preferred articles according to the invention are:

| (a) | Recoverable layer | cross-linked polyethylene 1 mm |
| --- | --- | --- |
| | Heater | perforated brass foil |
| | Compatibility Material | ethylene-ethyl acrylate copolymer 0.25 mm |
| | Bonding material | ethylene-ethyl acrylate copolymer 0.25 mm |
| (b) | Recoverable layer | cross-linked polyethylene 1 mm |
| | Heater | perforated aluminium foil |
| | Bonding material | ethylene-vinyl acetate copolymer (lightly cross-linked) 0.6 mm |
| (c) | Either (a) or (b) above coated with a hot melt adhesive, rather than a fusion bonding material. | |
| (d) | Recoverable layer | cross-linked polyethylene 1 mm |
| | Reinforcement layer | woven glass-fibres |
| | Connection layer | ethylene-ethyl acrylate copolymer 0.25 mm lightly cross-linked |
| | Recoverable layer | cross-linked polyethylene 1 mm |
| | Heater | perforated brass foil |
| | Compatibility Material | ethylene-ethyl acrylate copolymer 0.25 mm lightly cross-linked |
| | Bonding material | ethylene-ethyl acrylate copolymer 0.25 mm non cross-linked |

The article of the invention may be a tubular article. Preferably however, the article is a wrap-around article. This has the significant advantage of allowing the article to be installed around an object without having to gain access to an end of the object. When the article is being used to seal a pipe, this advantage can be seen to be particularly important. When the article is of the wraparound type, it will generally be necessary to provide some means for maintaining it in the wrapped configuration. One way of doing this is to provide upstanding rails along longitudinal edges of the sleeve which are held together by a channel, as described in GB-No. 1155470. An alternative method is to overlap the wraparound sleeve and to apply a patch over the overlap. The patch is generally a polyolefin based sheet covered with a high shear hot-melt adhesive, and may also have a contact adhesive to hold the patch secure during installation. Suitable patches are described in U.S. Pat. No. 3,770,556, U.S. Pat. No. 4,200,676, EP-A-No. 23788 and EP-A-No. 163508.

Most preferably the article is provided with a closure member positioned towards one edge of the article which is orientated substantially perpendicularly to the direction of recovery of the article, the closure member being adapted to engage a girdle member for holding the sleeve in its wrapped configuration during recovery thereof. For example, the closure member may be a bar or rail which is attached to the sleeve by means of stitching. Thus in another aspect, the invention provides an assembly for enclosing a part of an object comprising:

(a) a wraparound heat-recoverable article of the invention, having a closure member towards one edge adapted to engage a girdle member;

(b) a resilient girdle member for engaging the closure member and for encircling at least a portion of the article to retain the article in its wrapped configuration, at least during recovery of the sleeve; and (c) means for fastening the girdle member in its encircled configuration.

The girdle member is preferably heat resistant and of sufficient length to encircle the sleeve completely when in tension. Preferably the girdle member is formed from a heat resistant elastomeric material such as a silicone rubber. The girdle is preferably reusable but it need not necessarily be so, for example it could be permanently attached to the sleeve. The means for fastening the girdle in its encircled configuration may comprise press-studs, hooks and eyes, buttons and button-holes, or any other suitable devices. A closure for a wraparound heat-recoverable sleeve, which may comprise a girdle member, is disclosed in European Patent Application No. 87302560.5.

By appropriate arrangement of closure means, when necessary, a wraparound sleeve can be wrapped around the object more than once, preferably twice or in some circumstances, more than twice. Several significant advantages arise from the use of a multiwrapped article of this invention. In particular it allows the physical performance characteristics, such as the tensile strength, burst pressure and so on, to be varied by appropriate selection of the number of wraps of the article around the object. Once the article has been wrapped around the object two or more times and recovered, successive layers of the article become bonded together to form a substantially homogenous thick walled article, which has been recovered by an internally disposed heater. Since the article is heated internally to effect recovery, the problem of burning and splitting of the sleeves of the prior art is elegantly avoided. Furthermore, the use of multiwrapping to build up a thick walled article has the advantage of flexibility which is not available from a thick walled wraparound article whose inflexibility gives rise to inconvenience during installation. By multiwrapping, an article having a wall thickness of 30 mm, 50 mm or more can be made, which can be particularly suitable for joining or sealing large objects, such as pipes or pipe insulation having diameters of more than 100 cm. Multiwrapping enables the article to be given a wall thickness substantially equal to the object to which it is to form a bond, so that the article, by which the seal or joint is made, can be substantially as strong as the object itself. Multiple wrapping also allows the individual layers of the article to conform more closely to the underlying object(s), for example at the step down between an oversize casing and the jacket of an insulated pipe, thus reducing the risk of void formation between the article and the object and between successive layers of the article. The wraparound article may be supplied in sheet form for wrapping around an object, this having the advantage of enabling the article to be installed around an object without having to gain access to an end thereof. For some applications however, it can be advantageous to supply the article in its wrapped configuration, preferably after being consolidated to form a thick walled article, for example by partially recovering a wrapped article onto a mandrel. In this way, thick walled tubular articles can be manufactured conveniently.

When the wraparound article is wrapped around the object two or more times, it is preferred that the bonding material at that region of the sleeve which overlies an inner layer of the article is a material which can form a fusion bond to that inner layer. In this way, an article having a homogeneous thick wall can be made, and the resistance to creep at the interface between successive layers of the article is good.

The thickness of the article, and of the layers thereof, will be selected according to the application to which the article is to be put, the nature and size of the object to which the article is to bond, and the configuration of the article when in use (e.g. tubular, singly or multiply wrapped). It is preferred that the thickness before recovery of a non-multiply wrapped article (which may be tubular or singly wrapped) is at least 1.0, more preferably from 2.0 to 6.0 mm, with thicker articles being suitable for wrapping around especially large diameter objects. Especially preferred articles have a thickness of from 2.5 to 3.5 mm. The thickness of the installed article will be selected according to the performance required of it, thicker installed articles being preferred inter alia for higher pull-out strength, pressure retention, physical retention etc. The ability of the article of the invention to provide a thick walled article by heat recovery enables objects sealed or joined thereby to withstand high pressures without the danger of ballooning which is prevalent in some thin walled articles. Thus the article of the invention can withstand the pressures exerted during foaming of insulation around an uninsulated portion of an insulated pipe. The article can also withstand the pressures applied to the sealed cavity around an insulated pipe for testing the cavity seals. The high pressure capability of the article also allows it to be used to join pipes for conveying fluids at high pressure.

The thickness of the layer of heat-recoverable material, or the overall thickness of the layers of heat-recoverable material where there is more than one, is preferably less than 4.5 mm. It is particularly preferred that the thickness is from 0.5 to 3.5 mm, especially from 1.0 to 2.0 mm. The thickness of the layer of bonding material is preferably less than 2.5 mm, more preferably from 0.5 mm to 1.0 mm. When present, the thickness of the compatibility layer is preferably less than 0.5 mm, for example about 0.1 mm.

When the article of the invention is relatively thin, resistance to tensile forces can be achieved by multiple wrapping as described above. The article of the invention, even when thin, can also however find application for sealing and making joints since it can accomodate movement between the pipes, casings or other objects which are joined or sealed. When such a feature is desired, the article is preferably coated in a central region which overlaps both of the objects to be joined or sealed with a layer of a sealant such as a mastic which can accomodate movement while maintaining a seal. As used herein, the term sealant refers to materials which have a cohesive strength of the same order as their adhesive strength, and which are used to fill voids and interstices to provide a seal against moisture, dusts, solvents and other fluids. Sealants are viscid, water resistant macromolecular compositions resembling newtonian fluids in exhibiting both viscous and elastic response to stress. They exhibit, in the sense of ASTM 1146, at least second order cohesive blocking (and preferably second order adhesive blocking to metals as well) at a temperature.between room temperature and the crystalline melt or glass transition temperature or range of the composition. Known sealant compositions usually comprise mixtures of elastomers, or mixtures of thermoplastic polymers, or both. See Bullman, Adhesives Age, November 1976, pages 25–28 for information on hot melt sealants.

Sealant may also be used in a non-flexible application as a void filler, for example at a step down between an oversize casing and the jacket of an insulated pipe.

The heating element can conveniently be connected to a power source through electrodes. A particularly preferred form of electrode comprises a piece of a foil or braid, for example of copper, attached to an exposed surface of the heating element by conventional means, for example by welding, welding or soldering. Preferably, a portion of the surface of the heating element is exposed after the element has been laminated with the layers of heat-recoverable material and of bonding material, by removal of a portion of one of those layers. By appropriate arrangement of electrodes, the heating element can be arranged to be powered in modules to provide a desired profile of heat output over the area of the article. For example this can be advantageous when the heat-recoverable article is so large that the resistivity through a single heating element would be unacceptably high. It can also be advantageous when the article is to be recovered onto an object or objects with differing heat capacities at different regions thereof. Furthermore, a modular heating element can be advantageous when it is desired to recover the article non-uniformly, for example by powering the modules sequentially, or with different amounts of power.

The article of the invention can be used with advantage to seal new insulation around a joint between two insulated pipes or, for example about a repaired insulated pipe. Such pipes generally comprise a steel pipe for conveying a heating fluid, which is insulated by foam material. The foam is generally protected and sealed by an outer polymeric jacket which may comprise polyethylene or polyvinyl chloride. It is to the polymeric jacket that the article of the invention is required to bond. The article may be used to seal new insulation around an insulated pipe joint in conjunction with an oversize casing; when so used, the casing is positioned so as to bridge the uninsulated portion of the pipe, the article bonding to the polymeric jacket and to the casing at each end of the casing, so as to join the casing rigidly to the polymeric jacket beyond each end of the uninsulated portion of the pipe. In another embodiment, the article may itself span the uninsulated portion of the pipe and bond at each end to the polymeric jacket, beyond each end of the uninsulated portion of pipe. The portion of article between the ends of the uninsulated portion of the pipe may be arranged so as not to recover, for example by the absence of heating element from that portion. The article can also be used in other joining and sealing applications For example, it may be used to make a joint between fluid-conveying pipes. The pipes may comprise metal. More preferably they comprise polymeric material, to which the article may advantageously form a fusion bond. The objects (e.g. polymeric jackets, or pipes) may have a diameter of, for example from 3 cm to 150 cm, with thicker walled articles being used for larger sized objects.

In addition to its use in joints between insulated pipes, the article of the present invention may be used to join together pipes or other similar objects, particularly when of a fusible material, or to cover such objects for chemical or physical protection. The article may also find application as a splice case such as between telecommunications cables, and in cable joints when the heater may in use serve to screen the joint.

In yet another aspect, the invention provides a method of making a heat-recoverable article for bonding to an object, comprising:
(a) laminating together a layer of polymeric backing material, a layer of bonding material, and an inbuilt laminar metal heating element having a plurality of apertures through its thickness to permit the element to be deformed in the plane thereof by a change in shape of the apertures;
(b) cross-linking the backing material; and
(c) deforming the heating element as aforesaid, together with the layers laminated therewith, while the backing material is heated above its crystalline melt temperature, so as to render the layer of backing material heat-recoverable.

In a yet further aspect, the invention provides a method of bonding a heat-recoverable article to an object, comprising: positioning around the object a heat-recoverable article which comprises a layer of heat-recoverable material, a layer of a bonding material for forming a bond between the recoverable material and the object, and an inbuilt laminar metal heating element having a plurality of apertures through its thickness to permit the element to be deformed in the plane thereof by a change in the shape of the apertures;
(b) applying heat to the article, by means of the heating element, to cause the recoverable material to recover and to deform the heating element as aforesaid, in use to force the layer of bonding material against the object.

Preferably, the article used in this method is a wrap-around article which is therefore positioned around the article by wrapping. As discussed above this leads to several advantages, particularly in terms of the physical properties of the installed article, and of the joint or seal made thereby.

For some applications, it may be advantageous to employ an interface heater, positioned between the article of the invention and the object to be covered to promote fusion at the interface between the article and the object. This has particular advantage when used with a multi-wrapped article, since it enables a thick wall heat-recoverable article to be bonded to an object, notwithstanding the fact that the recovered article has a wall that would be too thick either to be recovered by means of a torch or other conventional heating means, or to transmit sufficient heat to cause fusion at the interface between the article and the object. The use of an interface heater enables the heat supplied at the interface to be carefully controlled, preferably in an installation step separate from that of recovering the article. This is particularly advantageous when the object would be susceptible to damage from overheating. The interface heater can advantageously be powered while the heat-recoverable material of the article is cooling. At this stage, considerable forces are generated as the recoverable material crystallises, and this force, together with the heat generated by the interface heater, can promote the formation of a fusion bond.

The interface heater may be used in a method of forming a fusion bond between a tubular first object and a second object placed coaxially therewithin, which method comprises:
(a) positioning a heat- recoverable driver around the first and second objects, and an interface heater at the interface between the first and second objects;
(b) heating the driver to cause it to recover and to deform the first object into contact with the second object; and
(c) connecting the interface heater to a source of electrical power so as to cause the first and second objects to fuse together.

It is preferred that the interface heater comprises one or more resistance wire heaters, associated with (for example embedded in) a web of a fusion bonding material.

In a preferred embodiment, the interface heater is provided by a portion of the heater of the article, which is powered separately from the remainder of the heater of the article.

BRIEF DESCRIPTION OF THE DRAWING

Embodiments of articles and methods of the invention, and uses thereof, will now be described by way of example with reference to the accompanying drawings, in which:

FIGS. 1a, 1b and 1c shows cross-sections through three embodiments of the article of the invention;

FIG. 2 shows a perspective view, partially in section, of an embodiment of the article; and FIG. 3 shows a sectional view through a joint between two insulated pipes, sealed by means of the article of the invention.

Referring to the drawings, FIG. 1a shows a layer 3 of polymeric material, thickness 1.0 mm, which consists essentially of polyethylene, and which has been cross-linked by high energy electron irradiation and then expanded to render it heat-recoverable. Prior to the cross-linking step, the polymeric material is laminated with a heating element 5, consisting of an apertured brass foil, thickness 0.1 mm, and a layer of bonding material 7, thickness 0.6 mm. The bonding material consists essentially of substantially non-crosslinked polyethylene.

FIG. 1b shows another embodiment of the article in which an apertured brass heater element 10 is disposed between two layers of polymeric material 12, 14 which are heat-recoverable as a result of cross-linking and expansion. Each, of the surfaces of the layers of polymeric material remote from the heating element is coated with a layer 15 of compatibility material consisting essentially of low density polyethylene. One of the layers of compatibility layers is provided with a layer of bonding material 16, consisting of substantially non-crosslinked ethylene vinyl-acetate copolymer.

FIG. 1c shows yet another embodiment of the article, which comprises three layers 17 of heat recoverable polymeric material. Layers 18 of woven glass fibres are positioned between adjacent pairs of the layers of polymeric material, ethylene-ethyl acrylate copolymer. An apertured brass foil 20 serves as a heater, positioned between an exposed surface of polymeric material and a compatibility layer 21 of lightly cross-linked ethylene ethyl-acrylate copolymer. The bonding layer 22 comprises non-crosslinked ethylene ethyl-acrylate copolymer.

FIG. 2 shows an article which is adapted to be multiply wrapped about an object. It comprises a layer 23 of heat-recoverable material in which a deformable metal heating element is embedded. The heater consists of a brass foil having diamond shaped apertures 24 over a substantial part of its area, and a web 26 extending along an edge of the article perpendicular to its direction of recovery. The bonding layer which is laminated to the layer of heat-recoverable material is split into two parts: a first part 30 for wrapping against an object consists of a hot melt adhesive and a second part 32 for wrapping over underlying layers of the article comprises non-crosslinked polyethylene. A closure member is provided at one end of the article: it comprises rail 34 which is attached to the layers of recoverable material and of bonding material by stitched or adhesive coated strips 36. The end 39 of the article to which the closure member is attached is chamfered to provide a smooth installed closure. In use, an elastomeric heat-resistant girdle member engages the rail 34 and holds the wrapped article in place during recovery. For example, the girdle may itself be provided with a rail which co-operates with the rail 34 and a channel member.

FIG. 3 shows how the article can be used to seal the cavity 50 surrounding a joint between two insulated pipes. The pipes comprise a steel fluid carrying pipe 52, joined with a weld 53, and insulated by foam 54 which is encased in a polymeric jacket 56. A casing 59 spans the uninsulated portion of the pipe 52, overlapping at each end the polymeric jacket 56. At the left hand end of the casing, an article of the invention 60 is shown prior to recovery, positioned so as to overlap the polymeric jacket 56 and the casing 59. Optional interface heaters 62, 64 are positioned between the article 60 and the jacket and the casing, to promote fusion as described above. At the right hand end of the casing, the article 60 is shown after recovery, with bonds formed between the article and the jacket 56 and the casing 59 respectively. After recovery, the interface heaters if present are connected to a source of electrical power to enhance the strength of the bonds. Advantageously, the cavity 50 is filled with a foamable liquid through a hole 66 after the cavity has been sealed: this is possible because of the pressure retention capability of the article and enables a high density of foam insulation to be produced. After foaming, the hole 66 can be sealed with an article of the invention or with patch of polymeric material coated with a layer of bonding material.

We claim:

1. A heat-recoverable article for bonding to an object, comprising a layer of heat-recoverable polymeric material, a layer of a bonding material for forming a bond between the recoverable material and the object, and a laminar metal heating element having a plurality of apertures through its thickness to permit the element to be deformed in the plane thereof by a change in the shape of the apertures, and being inbuilt in one of, or between, the said layers, the recoverable material being arranged such that when heated by the element, it can recover and deform the element as aforesaid, in use to force the layer of bonding material against the object.

2. An article as claimed in claim 1, in which the heating element is disposed between the layer of heat-recoverable material and the layer of bonding material.

3. An article as claimed in claim 1, in which the layer of heat-recoverable material is provided in two laminated portions, the heating element being disposed between them.

4. An article as claimed in claim 1, in which the bonding material is heat-activatable.

5. An article as claimed in claim 1, in which the compositions of the bonding material and the heat-recoverable material are substantially the same.

6. An article as claimed in claim 1, in which the cross-link density in the heat-recoverable material is greater than that in the layer of bonding material.

7. An article as claimed in claim 1, in which the heating element has an electrical resistivity of from $1.7 \times 10^{-6}$ to $100 \times 10^{-6}$ ohm.cm over a substantial part of its area.

8. An article as claimed in claim 1, which is a wrap-around article.

9. An article as claimed in claim 8, having a a closure member positioned towards an edge of the article which edge is orientated substantially perpendicularly to the direction of recovery of the article, the closure member being adapted to engage a girdle member for holding the sleeve in its wrapped configuration during recovery thereof.

10. An article as claimed in claim 1, having a total thickness before recovery over a substantial part of its area of at least 1.0 mm.

11. An article as claimed in claim 1, which includes a sheet of bonding material contiguous with the layers of heat-recoverable material and bonding material, to form the inner layer of the wrapped around article.

12. A method of making a heat-recoverable article for bonding to an object, comprising:
(a) laminating together a layer of polymeric backing material, a layer of bonding material, and an inbuilt laminar metal heating element having a plurality of apertures through its thickness to permit the element to be deformed in the plane thereof by a change in shape of the apertures;
(b) cross-linking the backing material; and
(c) deforming the heating element as aforesaid, together with the layers laminated therewith, while the backing material is heated above its crystalline melt temperature, so as to render the layer of backing material heat-recoverable.

13. A method as claimed in claim 12, in which the backing material is cross-linked by irradiation with high energy electrons.

14. A method of bonding a heat-recoverable article to an object, comprising:
(a) positioning around the object a heat-recoverable article which comprises a layer of heat-recoverable material, a layer of a bonding material for forming a bond between the recoverable material and the object, and an inbuilt laminar metal heating element having a plurality of apertures through its thickness to permit the element to be deformed in the plane thereof by a change in the shape of the apertures;

(b) applying heat to the article, by means of the heating element, to cause the recoverable material to recover and to deform the heating element as aforesaid, in use to force the layer of bonding material against the object.

15. A method of forming a fusion bond between a tubular first object and a second object placed coaxially therewithin, which method comprises:
(a) positioning a heat-recoverable driver around the first and second objects, and an interface heater at the interface between the first and second objects;
(b) heating the driver to cause it to recover and to deform the first object into contact with the second object; and
(c) connecting the interface heater to a source of electrical power so as to cause the first and second objects to fuse together.

* * * * *

UNITED STATES PATENT AND TRADEMARK OFFICE
CERTIFICATE OF CORRECTION

PATENT NO. : 4,866,252
DATED : September 12, 1989
INVENTOR(S) : Van Loo, et al

It is certified that error appears in the above-indentified patent and that said Letters Patent is hereby corrected as shown below:

Column 13, Line 22, after "material," insert --together with a connection layer 19 of lightly cross-linked--.

Signed and Sealed this

Fourteenth Day of December, 1993

Attest:

BRUCE LEHMAN

*Attesting Officer*  *Commissioner of Patents and Trademarks*